United States Patent
Miyajima et al.

(10) Patent No.: US 9,387,951 B2
(45) Date of Patent: Jul. 12, 2016

(54) LAMINATED, BLOW-MOLDED CONTAINER AND PROCESS FOR FORMING ONE OR MORE AIR INTAKE HOLES

(75) Inventors: Hisao Miyajima, Koto-ku (JP); Mitsuhiro Sotome, Tochigi (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 14/241,176

(22) PCT Filed: Aug. 8, 2012

(86) PCT No.: PCT/JP2012/070140
§ 371 (c)(1),
(2), (4) Date: Apr. 15, 2014

(87) PCT Pub. No.: WO2013/031494
PCT Pub. Date: Mar. 7, 2013

(65) Prior Publication Data
US 2014/0239002 A1 Aug. 28, 2014

(30) Foreign Application Priority Data
Aug. 31, 2011 (JP) .................................. 2011-188750

(51) Int. Cl.
*B65D 1/02* (2006.01)
*B65D 77/22* (2006.01)
(Continued)

(52) U.S. Cl.
CPC . *B65D 1/023* (2013.01); *B26F 1/02* (2013.01); *B29C 49/4273* (2013.01); *B65D 1/0215* (2013.01); *B65D 77/225* (2013.01); *B26F 2210/00* (2013.01); *B29C 49/22* (2013.01);
(Continued)

(58) Field of Classification Search
CPC ............. B05B 11/0043; B65D 1/0215; B65D 83/0055; B65D 77/225
USPC ............................................................ 215/40
See application file for complete search history.

(56) References Cited

U.S. PATENT DOCUMENTS 5,242,085 A * 9/1993 Richter et al. ................ 222/105
5,301,838 A * 4/1994 Schmidt et al. ................ 222/95
(Continued)

FOREIGN PATENT DOCUMENTS

JP  A 8-244102  9/1996
JP  A 9-301372  11/1997
(Continued)

OTHER PUBLICATIONS

Sep. 11, 2012 Search Report issued in International Patent Application No. PCT/JP2012/070140 (with translation).
(Continued)

*Primary Examiner* — Jeffrey Allen
*Assistant Examiner* — Jennifer Castriotta
(74) *Attorney, Agent, or Firm* — Oliff PLC

(57) ABSTRACT

A blow-molded container comprises a synthetic resin outer layer that forms an outer shell in a fixed shape, a synthetic resin inner layer laminated with this outer layer in a peelable manner, and one or more air intake holes is/are formed at a predetermined position or positions of a neck. An inside opening of the each air intake hole has a horn shape with an increased diameter on an inner-surface side of the outer layer, and a notch-like interspace is formed between the outer layer and the inner layer in a peripheral area of the inside opening of the air intake hole.

7 Claims, 10 Drawing Sheets

(51) Int. Cl.
  *B26F 1/02* (2006.01)
  *B29C 49/42* (2006.01)
  *B29C 49/22* (2006.01)
  *B29L 9/00* (2006.01)

(52) U.S. Cl.
  CPC ... *B29C2793/009* (2013.01); *B29C 2793/0018* (2013.01); *B29L 2009/001* (2013.01)

(56) References Cited

U.S. PATENT DOCUMENTS 5,344,045 A * 9/1994 Richter et al. .................... 222/1
5,567,377 A * 10/1996 Nishigami et al. ............. 264/515
8,794,487 B2 * 8/2014 Maas et al. ...................... 222/95
2004/0112921 A1 * 6/2004 Nomoto et al. ............. 222/321.9

FOREIGN PATENT DOCUMENTS

| JP | A 10-202595 | 8/1998 |
| JP | A 2006-182389 | 7/2006 |
| JP | A 2008-207861 | 9/2008 |

OTHER PUBLICATIONS

Translation of Sep. 11, 2012 Written Opinion issued in International Patent Application No. PCT/JP2012/070140.

* cited by examiner (a)

(b)

Figs. 4(a), 4(b), and 4(c)
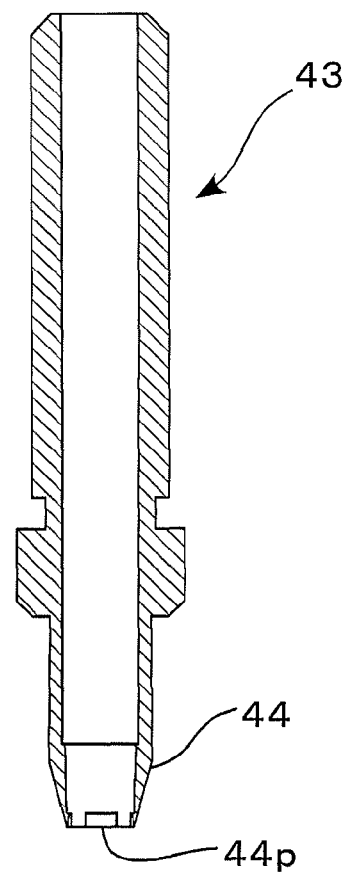
(a)
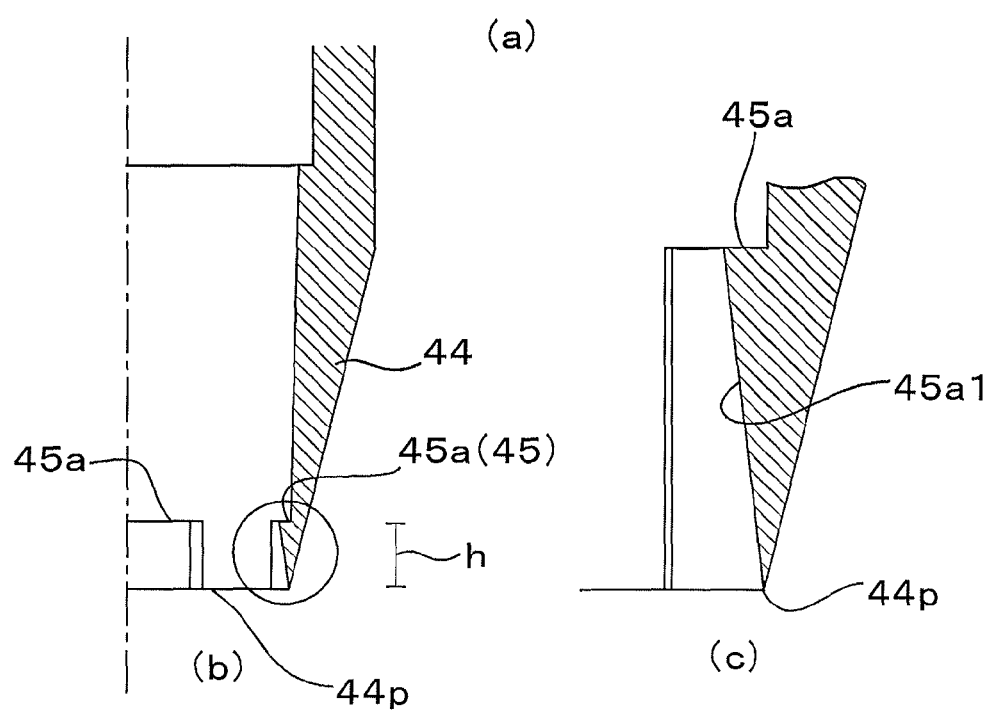
(b)          (c)

(a)

(b)

Figs. 6(a), 6(b), and 6(b)
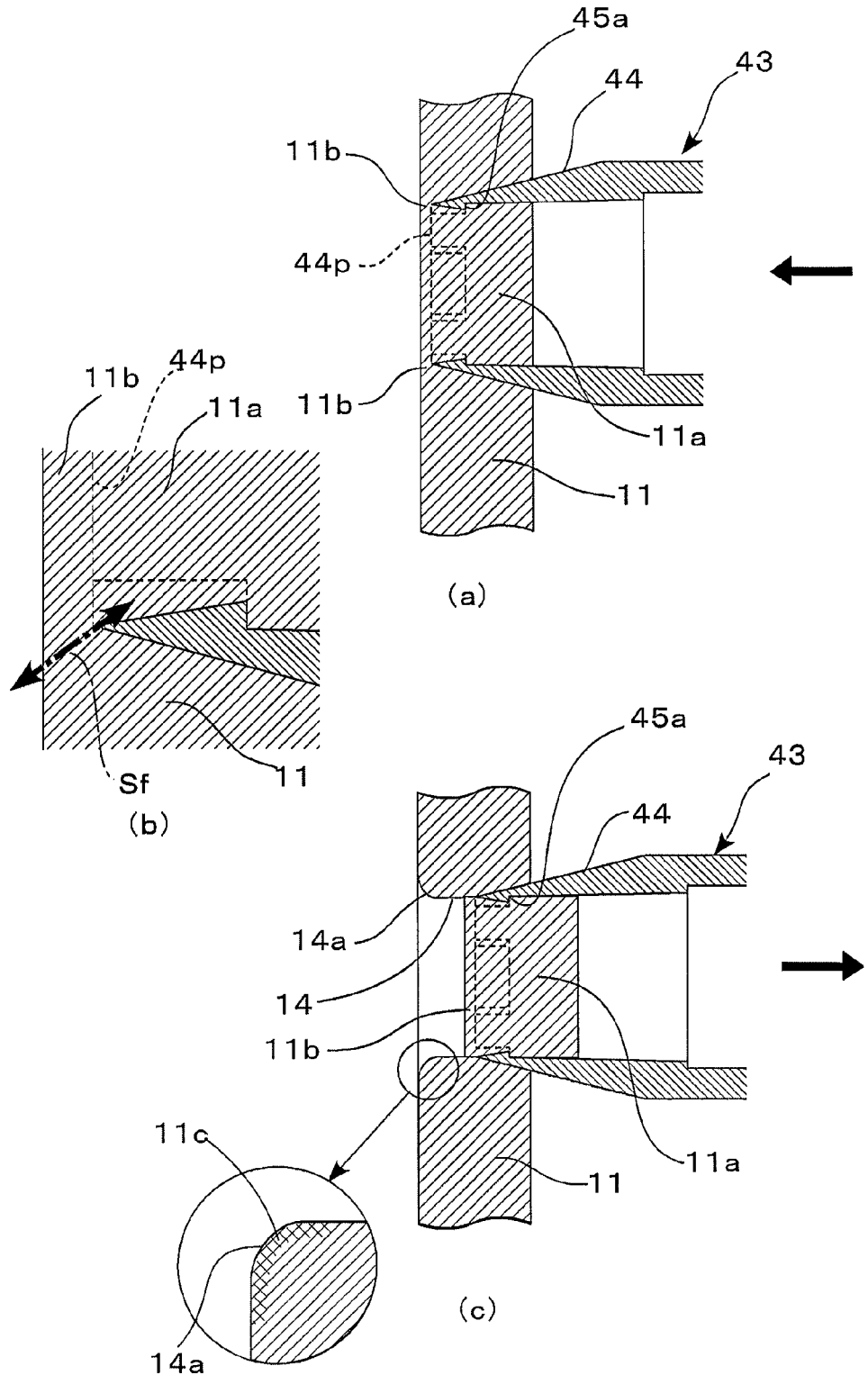

(a)

(b)

(a)

(b)

ized to the bottom of the container. The technical field of this invention is directed to a laminated, blow-molded container, which comprises an outer layer of a synthetic resin that forms an outer shell in a fixed shape and an inner layer that forms an inner bag to be laminated with this outer layer in a peelable manner, wherein one or more air intake holes is/are cut out in the neck to take outside air into the interspace between the outer layer and the inner layer, and to a process for forming these air intake holes.

LAMINATED, BLOW-MOLDED CONTAINER AND PROCESS FOR FORMING ONE OR MORE AIR INTAKE HOLES

TECHNICAL FIELD

This invention relates to a laminated, blow-molded container, which comprises an outer layer of a synthetic resin that forms an outer shell in a fixed shape and an inner layer that forms an inner bag to be laminated with this outer layer in a peelable manner, wherein one or more air intake holes is/are cut out in the neck to take outside air into the interspace between the outer layer and the inner layer, and to a process for forming these air intake holes.

BACKGROUND ART

The laminated, blow-molded containers comprising a synthetic-resin outer layer forming an outer shell of a fixed shape and an inner layer forming an inner bag to be laminated with this outer layer in a peelable manner, i.e., the so-called easy-to-delaminate bottles, are known. Patent document D1 describes an invention regarding a process and the equipment for punch-cutting one or more air intake holes in a portion of the outer layer in the neck to take in outside air.

FIG. 9 is an explanatory diagram showing schematically the process for forming an air intake hole. This diagram corresponds to FIG. 2 of the patent document D1 and shows a laminated, blow-molded container 1 along with a punch-cutting machine 30. The container 1 is an easy-to-delaminate bottle comprising a neck 2, a shoulder 3, and a body 4 and having the outer layer 11 laminated with the inner layer 12. The punch-cutting machine 30 mainly comprises a stationary member 31 and a cutting member 40 shown by a hatched area in the vertical section of FIG. 9.

The stationary member 31 comprises a support rod 34 hanging downward from a support member 32 and a cutter stop 36 disposed at a lower end portion of this support rod 34. The cutting member 40 comprises a sliding member 41, which is supported in a manner slidable from side to side by a support shaft 33 disposed horizontally and fitted to the support member 32, a cutter holder 42 hanging downward from this sliding member 41, and a punch-cutter 43 disposed at a lower end portion of the cutter holder 42 so that the punch-cutter 43 is opposed to the cutter stop 36 of the stationary member 31.

The punch-cutter 43 has a cylindrical blade 44 at the tip and a through-hole 46 to take out a cut piece 11a. When a driving means (not shown) is used to move the sliding member 41 to the left (in the X direction in FIG. 9) along the support shaft 33, the punch-cutter 43 also moves until the front face of a bolt 37 bumps into the support rod 34. At that time, the cylindrical blade 44 presses the inner layer 12 of the neck 2 of the container 1 against an opposed surface 36a of the cutter stop 36. Then, the blade 44 cuts into the outer layer 11 of the neck 2 of the container 1 forcibly, and cuts out a piece of the outer layer 11 while leaving the inner layer 12 intact, thus forming one or more air intake holes to take outside air into the interspace between the inner layer 12 and the outer layer 11. The air intake hole can be formed solely in the outer layer 11 by adjusting the bolt 37 to set a gap, t, between the blade edge of the cylindrical blade 44 of the punch-cutter 43 and the opposed surface 36a, at a length equivalent to the thickness of the inner layer 12.

FIG. 10 is a vertical section showing a state of lamination of the outer layer 11 and the inner layer 12 near an air intake hole 14 that has been formed as described above. After blow molding, the easy-to-delaminate bottles of this kind have the inner layer 12 and the outer layer 11 that should be peelable from each other, but in fact are in tight contact in many cases. Therefore, in some of the dispensing container products utilizing the easy-to-delaminate bottles of this kind, it is often difficult, after a content fluid has been dispensed, to utilize a pressure drop inside the bottle so as to take outside air smoothly into the interspace between the outer layer 11 and the inner layer 12 through one or more air intake holes 14. After the air intake hole or holes 14 has/have been formed, a vacuum pump and the like are used in many cases to suck air through the neck 2 in order to put the bottle inside forcibly under a reduced pressure condition. This causes the outer layer 11 and the inner layer 12 to be peeled from each other, and tentatively releases the tight contact of these layers over the entire region. Thereafter, air is blown through the neck 2 to bring the outer layer 11 and the inner layer 12 back to a laminated state.

PRIOR ART REFERENCES

Patent Document

JP Publication number 1996-244102

SUMMARY OF THE INVENTION

Problems to be Solved by the Invention

Fluctuations in the thickness of parison are often found in the blow molding operations. According to the process for forming one or more air intake holes described in the patent document D1, the air intake holes can be cut out in the outer layer 11 alone, despite of the fluctuations in the thickness, once the gap, t, in FIG. 9 has been set at a minimum thickness of the inner layer 12. Practically, however, this process requires that the blade edge of the punch-cutter comes in direct contact with the outer peripheral surface of the inner layer 12 to cut out holes through the outer layer 11 completely. Under such a condition, a vestige of cut could remain in the inner layer 12, and there may be a fear that the thinned inner layer 12 would be broken. Besides, there is another problem in that the punch-cutting of the outer layer 11 creates cutting chips, which are difficult to remove. These remaining chips are also inconvenient for the air intake holes to open easily.

Meanwhile, even in the case where the outer layer 11 and the inner layer 12 are forcibly peeled from each other to release these layers from the tight contact tentatively over the entire region and then are brought back to the laminated state, there still remains the fear that these layers partially return to a tight contact state again, so that the inner layer 12 cannot be peeled from the outer layer 11 smoothly and reliably. This is because the inner layer 12 in the neck 2 has a large thickness, and as such, tends to have high rigidity and large power of elastic recovery after peeling.

This invention is intended to solve the problems found in the easy-to-delaminate bottles of prior art. Thus, a first technical problem of this invention is to create a process for forming one or more air intake holes, while keeping the inner layer intact without leaving in it any vestige of cut caused by the blade edge of the punch-cutter. Another technical problem is to create a shape of the air intake holes so that the peeling of the inner layer from the outer layer would go on smoothly and reliably around an inside opening of each air intake hole on the inner-surface side of the outer layer.

Means of Solving the Problems

This invention relates to a laminated, blow-molded container of an easy-to-delaminate bottle type and a process for forming one or more air intake holes. The descriptions will first take up the process for forming one or more air intake holes in the laminated container, and then followed by the laminated, blow-molded container. Among the features of this invention to solve the above-described technical problems, a main feature associated with the process is a process for forming one or more air intake holes in a laminated, blow-molded container comprising an outer layer of a synthetic resin that forms an outer shell in a fixed shape and an inner layer of a another synthetic resin that forms an inner bag to be laminated with this outer layer in a peelable manner, wherein the air intake hole or holes is/are cut out with a punch-cutter through the outer layer at a predetermined position or positions of the neck, characterized in that:

the punch-cutter to be used has a cylindrical blade at the tip, and also has a hooking portion or portions, which is/are disposed on an inner peripheral surface of the cylindrical blade and which performs a function of hooking into a portion of the outer layer that has come inside the cylindrical blade so as to prevent the cylindrical blade from slipping out of that portion of the outer layer at a time when the cylindrical blade is moved backward, the cylindrical blade is pressed forward until the blade edge comes to a position quite close to the inner surface of the outer layer, and at this position, the outer layer is not yet cut out completely, but there still remains a circular uncut portion ahead of the blade edge, then, the cylindrical blade is moved backward, and the cut piece inside the cylindrical blade is also moved backward along with the uncut portion because of the function of the hooking portion or portions that can hook into a portion of the outer layer that has come inside the cylindrical blade so as to prevent the cylindrical blade from slipping out of this portion of the outer layer, and the uncut portion is broken due to this backward movement, and the cut piece is taken out in a completely cut shape so that the air intake hole is cut out as a through-hole.

According to the above-described process for forming one or more air intake holes, the cylindrical blade edge disposed at the tip of the punch-cutter remains inside the outer layer and does not come in direct contact with the inner layer. Thus, one or more air intake holes can be formed, while keeping the inner layer intact without leaving in it any vestige of blade edge of the punch-cutter found in the cases of conventional processes for forming the air intake holes. Due to the function of the hooking portion or portions that can hook into a portion of the outer layer that has come inside the cylindrical blade so as to prevent the cylindrical blade from slipping out of this portion of the outer layer, this portion, i.e., a cut piece inside the cylindrical blade, is moved backward along with an uncut portion. This backward movement causes the uncut portion to be broken, and the cut piece now in a complete cut-out shape remains inside the cylindrical blade. Then, the whole cut piece can be taken out of the air intake hole smoothly. This process can eliminate the prior-art problem of chips that remain in the air intake holes and are difficult to remove.

Another feature associated with the process for forming one or more air intake holes is that in the above-described main feature, diameter-reduced step portions are disposed in some places on the inner peripheral surface of the cylindrical blade of the punch-cutter, and are used as the hooking portion or portions.

The process of this invention is characterized in that use is made of a punch-cutter provided with a hooking portion or portions disposed on the inner surface of the cylindrical blade and that an uncut portion connected to the cut piece inside the cylindrical blade is broken by utilizing the hooking portion or portions which perform(s) the function of hooking into the cut piece. The shape of the cylindrical blade including the hooking portion or portions can be determined appropriately by giving consideration to the ability of the cylindrical blade to cut into the outer layer forcibly and move forward, the cutting workability of the outer layer, and the easiness of the uncut portion to be broken by the function of the hooking portion or portions. The above-described feature is one of practical examples for the hooking portion or portions. More specifically, the diameter-reduced step portions fully perform the function of preventing the cut piece from being left in place. The uncut portion can be easily broken by using this diameter-reduced step portions to hook the cut piece remaining inside the cylindrical blade. The shape of the diameter-reduced step portions, including what distance it should take from the diameter-reduced step portions to the blade edge and to what extent the diameter should be reduced, can be appropriately determined, giving consideration to the above-described factors, such as the ability of the cylindrical blade to cut into the outer layer forcibly and move forward, the cutting workability of the outer layer, and the easiness of the uncut portion to be broken by the function of the hooking portion or portions that can hook into a portion of the outer layer that has come inside the cylindrical blade so as to prevent the cylindrical blade from slipping out of this portion of the outer layer.

Still another feature of this invention associated with the process for forming one or more air intake holes is that, in the feature of the diameter-reduced step portions serving as the hooking portion or portions, the inner peripheral surface of the cylindrical blade is formed so that the bore diameter widens in a tapered manner over a range from the edges of the diameter-reduced step portions to the blade edge.

Still another feature of this invention associated with the process for forming one or more air intake holes is that, in the feature of the diameter-reduced step portions serving as the hooking portion or portions, the diameter-reduced step portions are disposed at some intervals in the circumferential direction.

If the diameter-reduced step portions are disposed all along the inner peripheral surface of the cylindrical blade, there is concern that the ability of the cylindrical blade to cut into the outer layer forcibly and move forward and/or the cutting workability of the outer layer may decrease. However, the decreases can be controlled when the diameter-reduced step portions are designed to make the bore diameter widen in a tapered manner over the range from the edges of the step portions to the blade edge and to have the step portions disposed at some intervals.

Still another feature of this invention associated with the process for forming one or more air intake holes is that, in the above-described main feature, a diameter-reduced taper portion is formed on the inner peripheral surface of the cylindrical blade of the punch-cutter by reducing the diameter toward the blade edge in a tapered manner, and this diameter-reduced taper portion is used as the hooking portion or portions.

This feature is also one of the practical examples of the hooking portion or portions. Since the diameter-reduced taper portion is used as the hooking portion, with no step portion formed, the ability of the cylindrical blade to cut into the outer layer forcibly and move forward and the cutting workability of the outer layer can be kept at favorable levels. The tapered surface in the diameter-reduced taper portion performs the function of preventing the cut piece from being left in place.

The laminated, blow-molded container of this invention can be made by using the above-described process for forming one or more air intake holes of this invention. A main feature associated with the laminated, blow-molded container of this invention is that an inside opening of each air intake hole has a horn shape with an increased diameter on the inner-surface side of the outer layer of the laminated, blow-molded container, which comprises a synthetic resin outer layer that forms an outer shell in a fixed shape and a synthetic resin inner layer laminated to this outer layer in a peelable manner, wherein each air intake hole or holes is cut out by a punch-cutter through the outer layer at a predetermined position of the neck.

In the vicinity of the inside opening of each air intake hole, the inner layer is laminated with the outer layer, and totally covers the inside opening. But since this inside opening of the air intake hole has a horn shape with an increased diameter on the inner-surface side of the outer layer, according to this feature of the container, notch-like interspace is formed between the outer layer and the inner layer in the horn-shaped area along the edge of the inside opening, as observed in the vertical section of FIG. 2(a), and this interspace grows narrower toward the periphery. Using this notch-like interspace as a starting point, the peeling of the laminated inner and outer layers begins and goes on smoothly. Outside air can be easily taken into further interspace between the outer layer and the inner layer by way of the air intake hole or holes.

Another feature of this invention associated with the laminated, blow-molded container is that, in the above-described main feature, an irregular surface is formed along the edge of the inside opening of each air intake hole on the inner-surface side of the outer layer, as caused by flash that develops during the punch-cutting step using a punch-cutter According to the above-described feature, the irregular surface caused by the flash is formed along the edge of the inside opening of each air intake hole on the inner-surface side of the outer layer. This irregular surface prevents the tight contact of the outer layer with the inner layer along the edge of the inside opening of the air intake hole. In addition to the existence of notch-like interspace, the irregular surface also helps the outer and inner layers to start and continue the peeling from each other reliably. Thus, outside air would be easily taken into the further interspace between the outer layer and the inner layer in other parts of the container by way of the air intake hole or holes.

Due to the function of the hooking portion or portions that can hook into a portion of the outer layer that has come inside the cylindrical blade so as to prevent the cylindrical blade from slipping out of this portion of the outer layer, the cut piece inside the cylindrical blade is moved backward along with the uncut portion. This backward movement causes the uncut portion to be broken, and the cut piece now in a complete cut-out shape remains inside the cylindrical blade. Then, the cut piece can be taken out of each air intake hole smoothly. According to this process for forming one or more air intake holes of this invention, the inside opening of each air intake hole on the inner-surface side of the outer layer has a horn shape with an increased diameter along the edge of the inside opening. In addition, when the uncut portion is forcibly broken, flash develops around the inside opening, and an irregular surface is formed.

Effects of the Invention

This invention having the above-described features has the following effects:

According to the above-described process for forming one or more air intake holes, the cylindrical blade edge disposed at the tip of the punch-cutter remains inside the outer layer and does not come in direct contact with the inner layer. Thus, the air intake hole or holes can be formed while keeping the inner layer intact without leaving in it any vestige of blade edge of the punch-cutter, such as found in the cases of conventional processes for forming the air intake holes. Due to the function of the hooking portion or portions that can hook into a portion of the outer layer that has come inside the cylindrical blade so as to prevent the cylindrical blade from slipping out of this portion of the outer layer, the cut piece inside the cylindrical blade is moved backward along with the uncut portion. This backward movement causes the uncut portion to be broken, and the cut piece now in a complete cut-out shape remains inside the cylindrical blade. Then, the whole cut piece can be taken out of each air intake hole smoothly. This process can eliminate the prior-art problem of chips that remain in the air intake holes and are difficult to remove.

The inside opening of each air intake hole on the inner-surface side of the outer layer has a horn shape with an increased diameter, according to a feature of the laminated, blow-molded container of this invention. Because of this horn shape, notch-like interspace is formed between the outer layer and the inner layer along the edge of the inside opening, and this interspace grows narrower toward the periphery. Using this notch-like interspace as a starting point, the peeling of the laminated inner and outer layers begins and goes on. Outside air can be easily taken into further interspace between the outer layer and the inner layer by way of the air intake hole or holes. Furthermore, an irregular surface caused by the flash is formed along the edge of the inside opening on the inner-surface side of the outer layer. This irregular surface prevents the tight contact of the outer layer with the inner layer along the edge of the inside opening of the air intake hole. In addition to the existence of notch-like interspace, the irregular surface also helps the outer and inner layers to start and continue the peeling from each other reliably. Thus, outside air would be easily taken into the further interspace between the outer layer and the inner layer in other parts of the container by way of the air intake hole or holes.

BRIEF DESCRIPTION OF THE DRAWINGS

FIG. 4 show an embodiment of a punch-cutter used in forming the air intake hole of FIG. 1, in which FIG. 4(a) is a vertical section, FIG. 4(b), an enlarged view of a cylindrical blade and its vicinity; and FIG. 4(c), a further enlarged view of the blade edge and its vicinity.

FIGS. 6(a), 6(b), and 6(c) are schematic diagrams showing the steps of forming an air intake hole.

FIG. 7 show another embodiment of the punch-cutter, in which

FIG. 8 show still another embodiment of the punch-cutter, in which

PREFERRED EMBODIMENTS OF THE INVENTION

Figure 1:
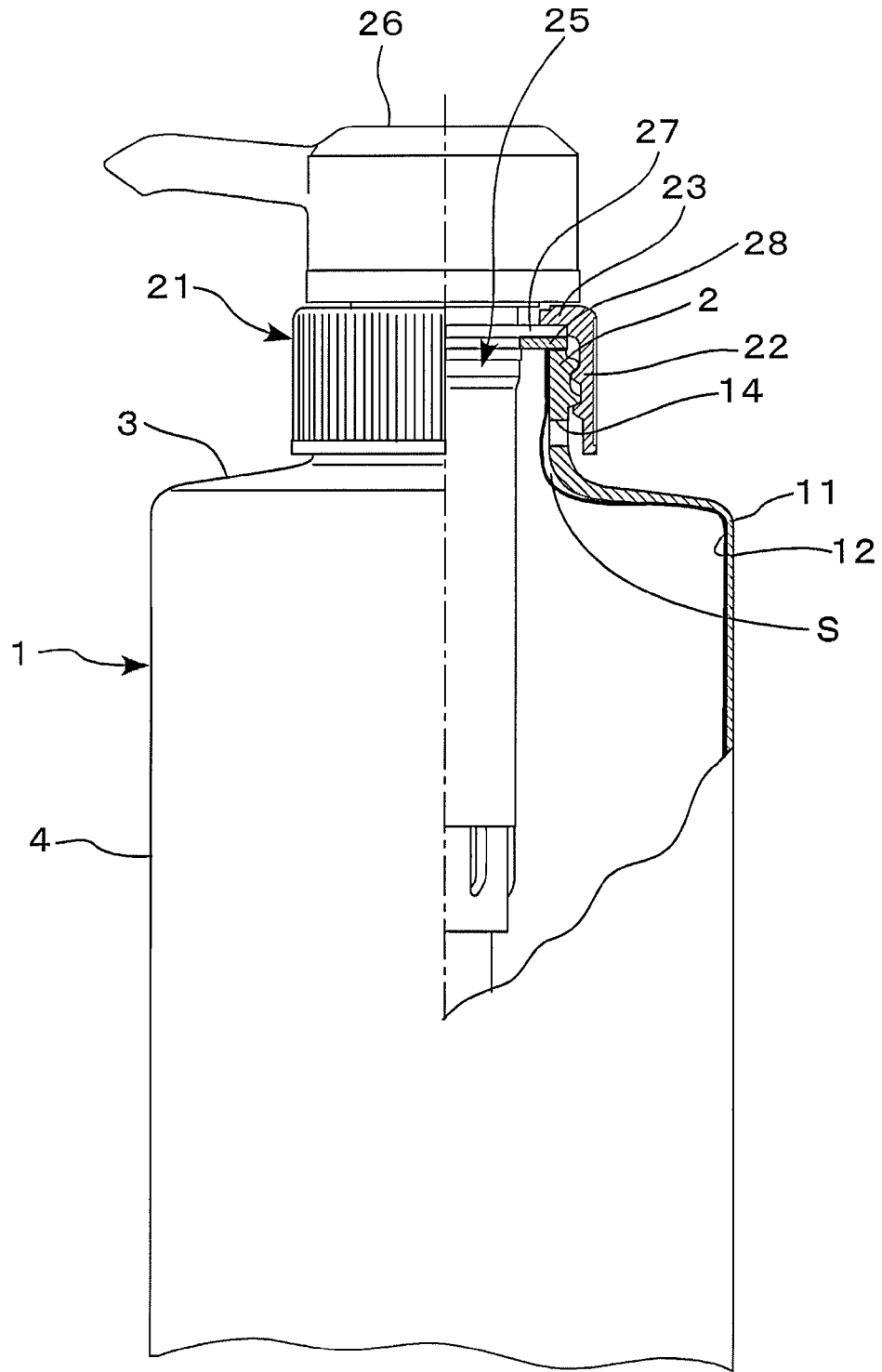
FIG. 1 is a side view of a dispensing container with a pump, partially shown in a vertical section, wherein the container of this invention in one embodiment is used as the container body.

The features and action-and-effects of this invention are further described with respect to preferred embodiments, now referring to the drawings, in which FIG. 1 is a side view of a dispensing container with a pump, shown partially in a vertical section, wherein the container of this invention in one embodiment is used as the container body. The container 1, which is an easy-to-delaminate bottle, has a laminated wall structure comprising an outer layer 11 made of a synthetic resin that forms an outer shell in a fixed shape and an inner layer 12 made of a another synthetic resin that forms an inner bag, which is laminated with the outer layer 11 in a peelable manner. A neck 2 is disposed at an upper end of a cylindrical body 4 having a bottom, by way of a shoulder 3 in a tapered cylindrical shape, with diameter reduced upward. The neck 2 has a screw thread spirally disposed on the outer peripheral surface, and one or more air intake holes 14 are cut out with a punch-cutter in a neck portion of the outer layer 11 under this screw thread. The container 1 of this embodiment has the outer layer 11 made of a high-density polyethylene (HDPE) and the inner layer 12 made of a nylon resin. In general, a pair of air intake holes 14 is cut out in the front and rear sides (one on the right, the other on the left in FIG. 1).

A dispensing pump 25 having a nozzle head 26 is fitted to the container 1 by forming a brim-like fitting flange 27 on an upper end of the main part of the dispensing pump 25, putting this brim-like fitting flange 27 on the upper end of the neck 2, with a gasket ring 28 placed in between, under a condition that the main body of the dispensing pump 25 has been inserted into the container 1, and then by pushing up the fitting flange 27 onto the underside of an inwardly-projecting top plate 23 of a cap 21 provided with a screw-threaded cylindrical wall 22, which is engaged with a screw-threaded cylindrical wall of the neck 2. FIG. 1 shows the outer layer 11 and the inner layer 12 in a state in which a peeled space S has been formed near the air intake hole 14.

Figure 2A:
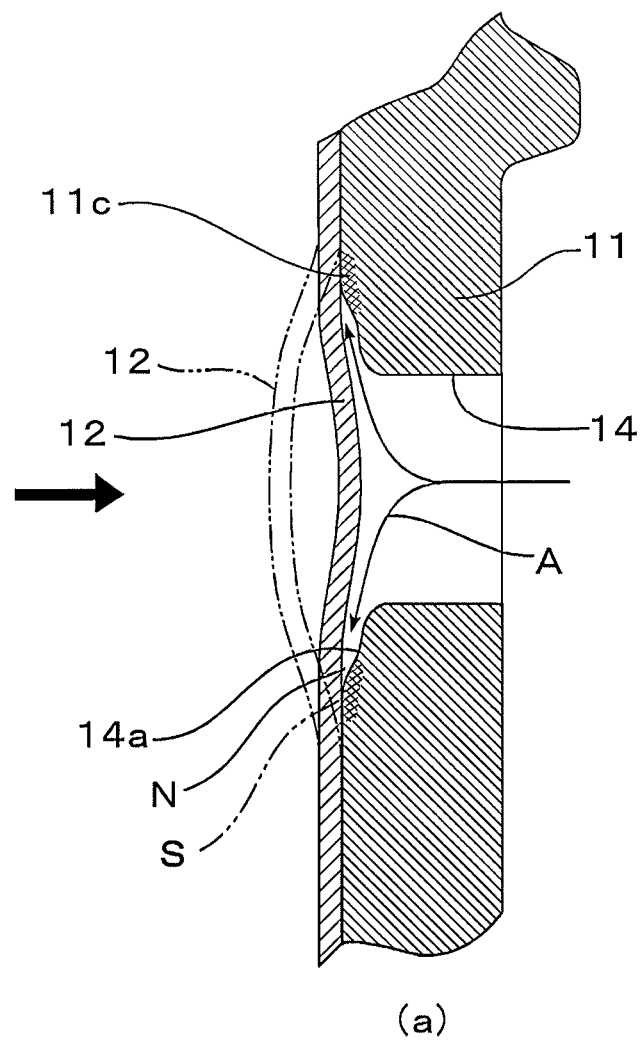
FIG. 2(a) is an enlarged vertical section of an important portion near an air intake hole cut in the container of FIG. 1.
Figure 2B:
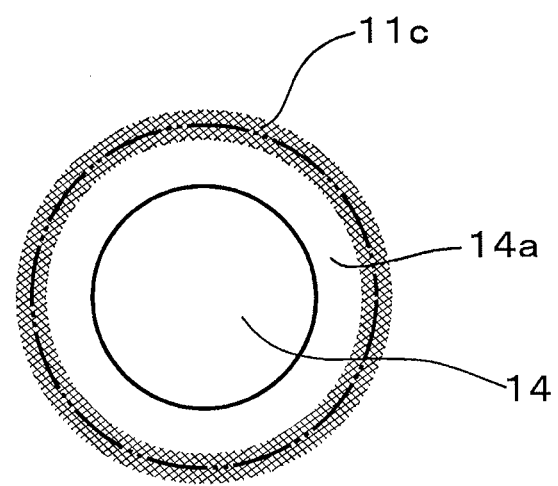
FIG. 2(b) is a front view of an air intake hole taken from the direction of a bold arrow in FIG. 2(a).

FIG. 2(a) is an enlarged vertical section of an important portion near an air intake hole of the container of FIG. 1, and FIG. 2(b) is a front view of the air intake hole taken from the direction of a bold arrow shown in FIG. 2(a). As shown by a horn-shaped area 14a in FIGS. 2(a) and 2(b), the inside opening of the air intake hole 14 has a horn shape with an increased diameter on the inner-surface side of the outer layer 11. A peripheral area of this inside opening of the air intake hole 14 on the inner-surface side of the outer layer 11 is cross-hatched in FIGS. 2(a) and 2(b). This peripheral area is an irregular surface area 11c caused by flash which has developed during the punch-cutting step using a punch-cutter. The horn-shaped area 14a and the flash-caused irregular surface area 11c are formed by employing the process for forming one or more air intake holes of this invention. The shapes of the horn-shaped area 14a and the irregular surface area 11c can be adjusted by setting appropriately the shape of the cylindrical blade 44 and the position at which the cylindrical blade 44 of the punch-cutter 43 is cut into the outer layer 11. This adjustment can also be made so that the horn-shaped area 14a and/or the irregular surface area 11c would not be formed substantially if it is a desired choice.

When the inside opening of each air intake hole 14 has a horn-shaped area 14a as described above, notch-like interspace, N, is formed between the outer layer 11 and the inner layer 12 in a peripheral area of the inside opening of the air intake hole 14, as found in the vertical section of FIG. 2(a). This notch-like interspace, N, performs a function as a starting point for the peeling to proceed. As shown by a two-dot chain line in FIG. 2(a), a peeled space, S, is widened by allowing the laminate peeling between the outer layer 11 and the inner layer 12 to begin and go on. As a result, outside air, A, can be easily taken into the interspace between the outer layer 11 and the inner layer 12 by way of the air intake hole or holes 14.

Furthermore, the irregular surface area 11c caused by the flash is formed along the edge of the inside opening of each air intake hole 14 on the inner-surface side of the outer layer 11. This irregular surface area 11c prevents the tight contact of the outer layer 11 with the inner layer 12 along the edge of the inside opening of each air intake hole 14. In addition to the existence of the notch-like interspace, N, the irregular surface area 11c also helps the outer and inner layers 11, 12 to start and continue the peeling from each other reliably.

Figure 10:
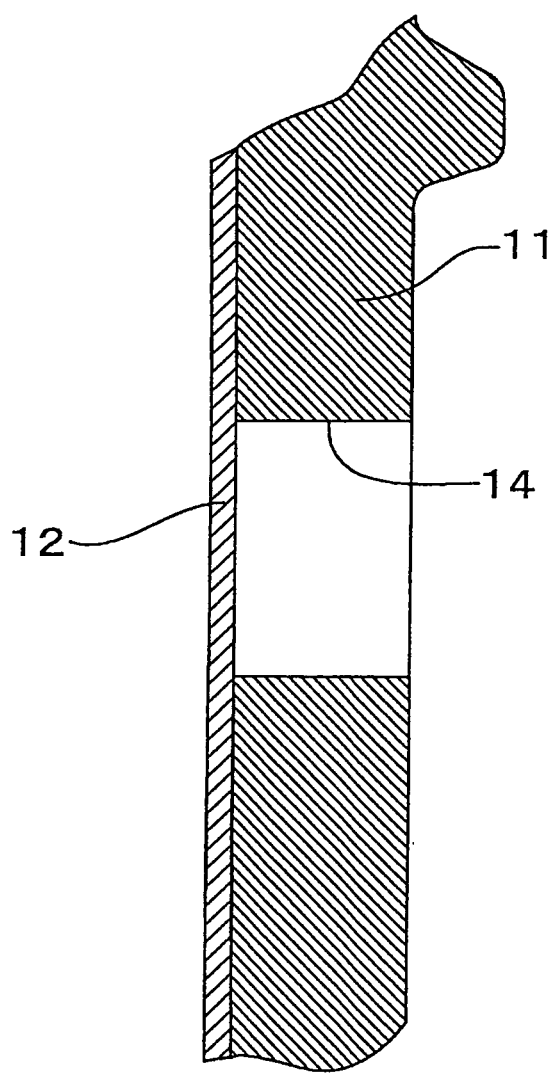
FIG. 10 is a vertical section showing a state of lamination for the outer and inner layers near a conventional air intake hole.

In a case of a conventional air intake hole 14 shown in FIG. 10, the outer layer 11 and the inner layer 12 are peeled from each other at one time, and the tight contact of these layers is tentatively released over the entire region. Thereafter, air is blown through the neck to bring the outer layer 11 and the inner layer 12 back to a laminated state. Even in that case, it often becomes difficult to start the peeling between the outer layer 11 and the inner layer 12 because there is no portion serving as the starting point, such as the notch-like interspace, N, shown in FIG. 2 or because the layers partially return to a tight contact state. For example, the dispensing container, such as shown in FIG. 1, may face with a decrease in workability in dispensing the content fluid.

Figure 3:
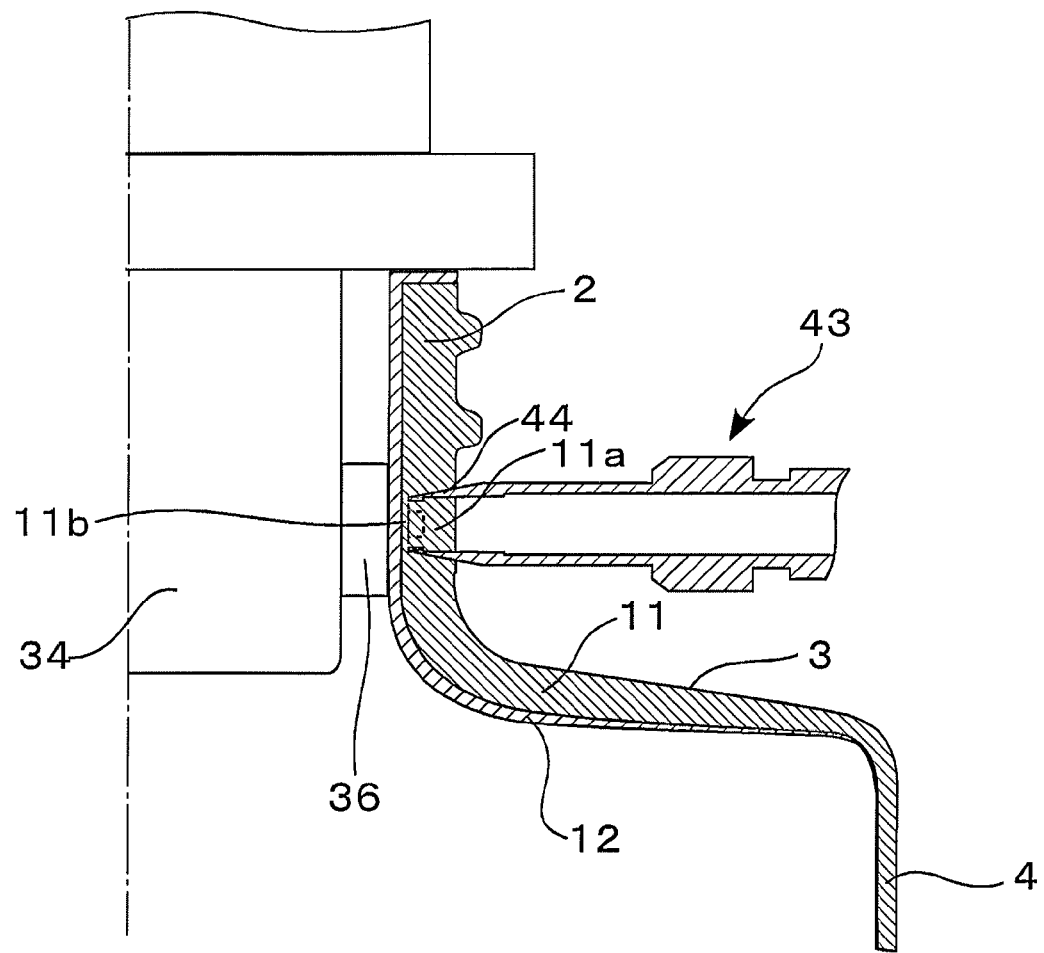
FIG. 3 is a schematic diagram showing the process for forming one or more air intake holes of this invention.
Figure 9:
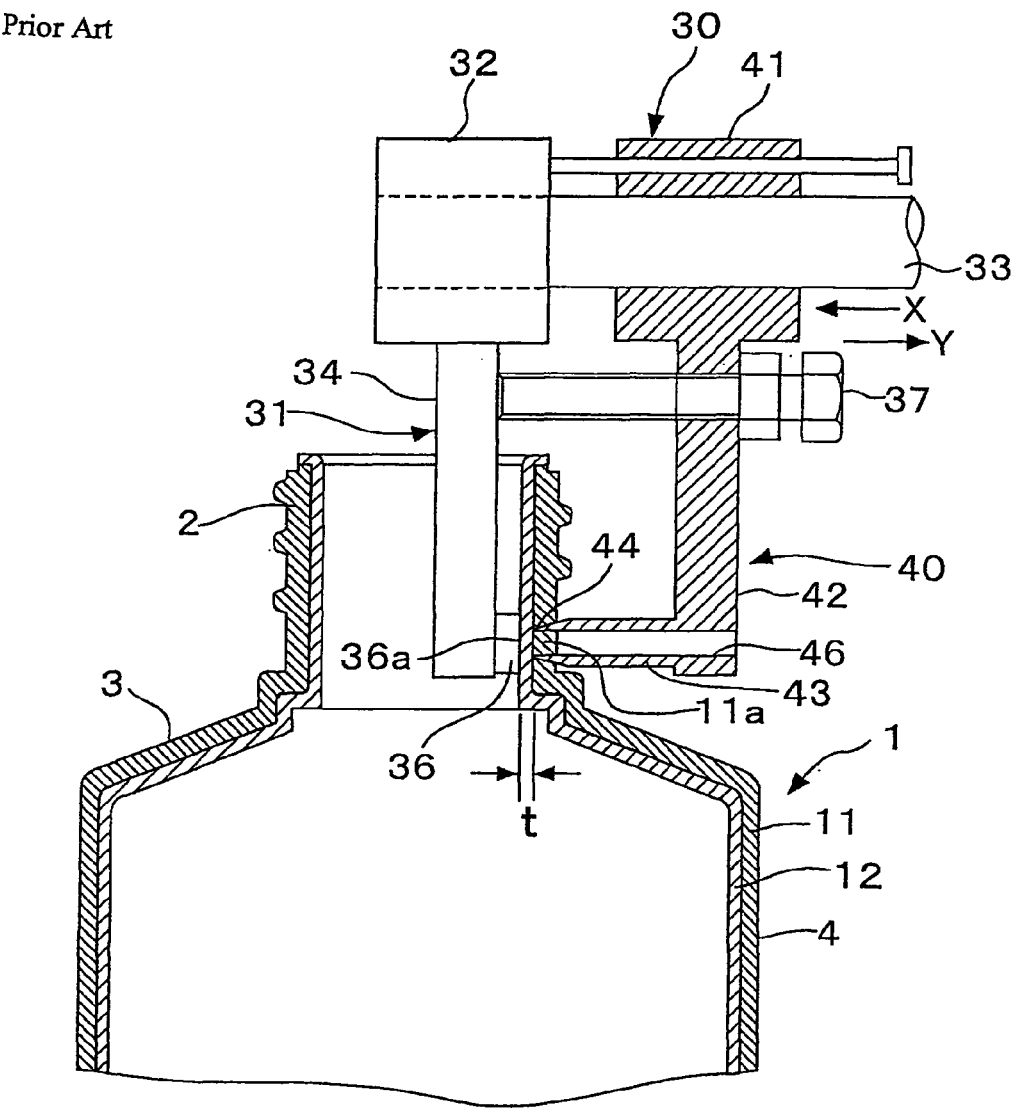
FIG. 9 is an explanatory diagram schematically showing a conventional process for molding air intake holes.

Next, the process for forming one or more air intake holes of this invention will be described below. FIG. 3 is a schematic explanatory diagram showing the process for forming one or more air intake holes of this invention. The overall structure of the punch-cutting machine in use is similar to that shown in FIG. 9. The punch-cutting machine comprises a support rod 34 having a cutter stop 36 disposed at a lower end thereof, the support rod 34 being inserted into the neck 2 of the container 1, and a punch-cutter 43 disposed at a position opposite this cutter stop 36. If a pair of the air intake holes 14 is to be formed, as is the case of the container 1 shown in FIG. 1, then the punch-cutting machines are disposed at bilaterally symmetric positions, and a pair of punch-cutters 43 is disposed on the left as well as on the right for dual punch-cutting operations.

Roughly, the process for forming one or more air intake holes of this invention comprises:

a) having the cylindrical blade 44 of a punch-cutter 43 cut into the outer layer 11 forcibly, b) leaving a circular uncut portion 11b to stay ahead of the blade edge without cutting through the outer layer 11 completely, and then c) moving the punch-cutter 43 backward to break the uncut portion 11b by utilizing the function of later-described hooking portion or portions 45 that can hook into a portion of the outer layer 11 that has come inside the cylindrical blade 44 so as to prevent the cylindrical blade 44 from slipping out of this portion of the outer layer 11, and thereby, to form one or more air intake holes 14. Thus, the air intake hole or holes 14 can be cut out by the process for forming one or more air intake holes of this invention, while keeping the inner layer 12 intact without leaving in it any vestige of cut caused by the blade edge of the punch-cutter. This is because the edge of the cylindrical blade 44 disposed at the tip of the punch-cutter 43 remains inside the outer layer 11 and does not come in direct contact with the inner layer 12.

Figure 5A:
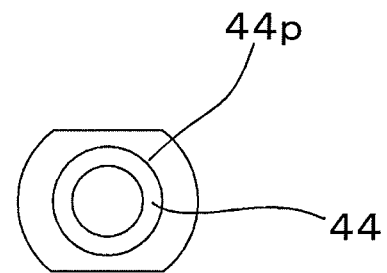
FIG. 5(a) is a bottom view of the punch-cutter of FIG. 4, and FIG. 5(b), an enlarged view of the blade edge of FIG. 5(a).
Figure 5B:
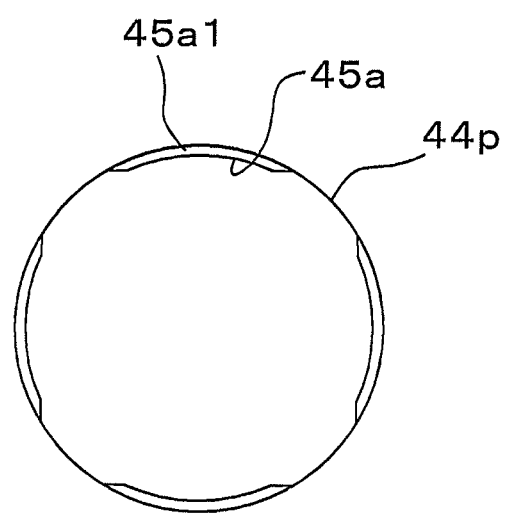

FIGS. 4 and 5 show the punch-cutter 43 used in this embodiment, in which FIG. 4(a) is a vertical section of the punch-cutter 43; FIG. 4(b), an enlarged view of the cylindrical blade 44 and its vicinity; FIG. 4(c), a further enlarged view of the blade edge 44p and its vicinity; FIG. 5(a), a bottom view of the punch-cutter 43; and FIG. 5(b), an enlarged view of the blade edge 44p shown in FIG. 5(a). This punch-cutter 43 has the cylindrical blade 44 at the tip. Diameter-reduced step portions 45a are an embodiment of the hooking portion 45, and are disposed on the inner peripheral surface of this cylindrical blade 44 at four positions with a space in between.

A range between the edges of the diameter-reduced step portions 45a and the blade edge 44p is a taper portion 45a1 where the diameter is increased in a tapered manner. In addition to the diameter-reduced step portions 45a that are spaced from one another, the diameter-increased taper portion 45a1 makes it possible for the cylindrical blade 44 to cut into the outer layer 11 forcibly and to move forward or move backward. The blade edge 44p of this punch-cutter 43 has a diameter of 4 mm, and the taper portion 45a1 has a height, h, of 0.8 mm from the diameter-reduced step portion 45a to the blade edge 44p (See FIG. 4(b)).

FIGS. 6(a)(b)(c) are schematic diagrams explaining the steps of forming an air intake hole 14. Individually, FIG. 6(a) shows a state of the cylindrical blade 44 in which it is located at a position of limit where it no longer can move forward; FIG. 6(b) is an enlarged view of blade edge 44p, and its vicinity, of the cylindrical blade 44 shown in FIG. 6(a); and FIG. 6(c) shows a state of the cylindrical blade 44 in which it has been moved backward from the limit for forward movement. As shown in FIG. 6(a), the blade edge 44p is disposed at the position of limit for forward movement, and stops short of the inner peripheral wall of the outer layer 11. In this embodiment, a lower portion of the neck 2 to be cut out for the air intake holes 14 has a thickness of 2.5 mm. The limit for forward movement is positioned at 0.02 mm from the inner peripheral surface of the outer layer 11. Under these conditions, the outer layer 11 is not cut out completely, and a cut piece 11a remains inside the cylindrical blade 44 in a state in which an uncut portion 11b is left to stay ahead of the blade edge 44p.

Then, the punch-cutter 43 is moved backward from the state shown in FIG. 6(a). Because of the hooking function of the diameter-reduced step portions 45a that prevents the cut piece 11a from being left in place, the cut piece 11a remaining inside the cylindrical blade 44 is hooked and moved backward along with the uncut portion 11b that has not yet been cut out, as shown in FIG. 6(c). This backward movement allows the uncut portion 11b to be broken, and the cut piece 11a is taken out in a completely cut shape so that the air intake hole 14 is cut out as a through-hole.

If the cut piece 11a is displaced in the direction of a bold arrow in FIG. 6(c) by the hooking function of the diameter-reduced step portions 45a, shearing stress acts on the uncut portion 11b in a direction shown by Sf in FIG. 6(b). Because the uncut portion 11b is broken due to this shearing stress, a horn-shaped area 14a having a larger diameter than the hole diameter is formed around the inside opening of the air intake hole 14. In addition, at the time when the uncut portion 11b is broken, the synthetic resin (HDPE resin in this embodiment) is more or less drawn and deformed. As a result, an irregular surface area 11c is formed by the flash that develops from the breakage in an area shown by cross-hatching in an enlarged view circled in FIG. 6(c).

Figure 7A:
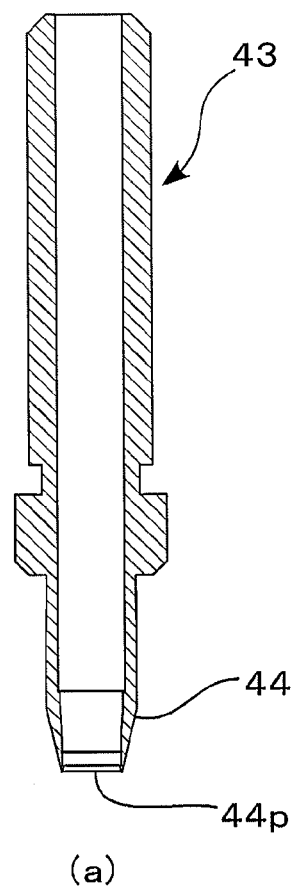
FIG. 7(a) is a vertical section.
Figure 7B:
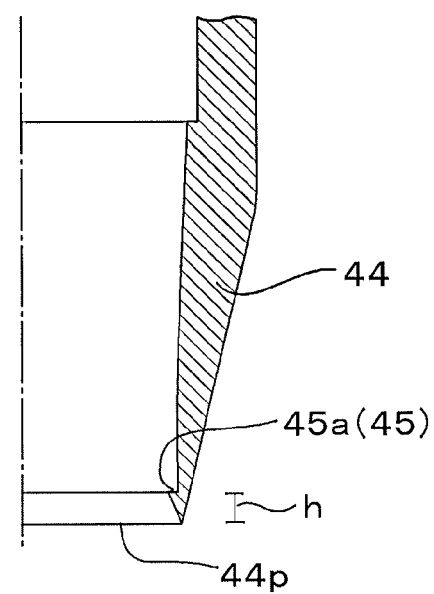
FIG. 7(b), an enlarged view of the blade edge and its vicinity.

The shape of the punch-cutter 43, and especially the shape of the hooking portion or portions 45, can be determined by paying attention to a balance among the ability of the cylindrical blade 44 to cut into the outer layer 11 forcibly and move forward, the cutting workability of the outer layer 11, and the function of the hooking portion or portions 45 that serve(s) to prevent the punch-cutter 43 from slipping out of the outer layer 11, while taking into consideration the material of the synthetic resin to be used for the outer layer 11. FIGS. 7 and 8 show other embodiments of the punch-cutter. In the embodiment of FIG. 7, a diameter-reduced step portion 45a is used as the hooking portion or portions 45, as is the case of the punch-cutter of FIG. 4, but this diameter-reduced step portion 45a is characterized in that it is disposed along the entire circumference of the inner peripheral surface of the cylindrical blade 44. As other features, the diameter of the step portion 45a is reduced to a less extent, and the height, h, from the edge to the blade edge 44p is set at as small as 0.4 mm, while giving consideration to the balance between the ability to cut into the outer layer 11 forcibly and move forward and the hooking function of the cylindrical blade 44.

Figure 8A:
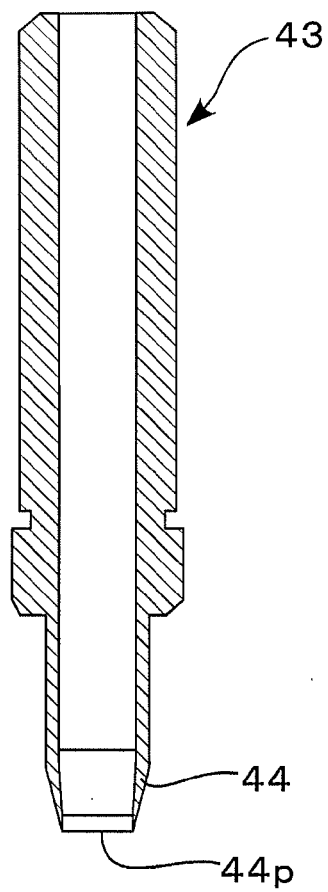
FIG. 8(a) is a vertical section.
Figure 8B:
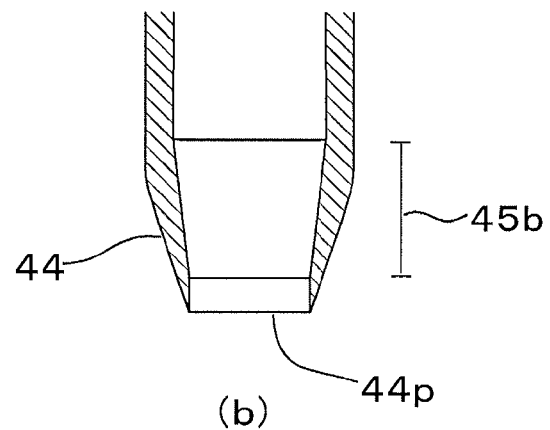
FIG. 8(b) is an enlarged view of the blade edge and its vicinity.

In the case of a punch-cutter 43 shown in FIGS. 8(a)(b), a diameter-reduced taper portion 45b is formed by reducing the bore diameter of the cylindrical blade 44 toward the blade edge 44p to enable the tapered surface of this diameter-reduced taper portion 45b to perform the hooking function. Since there is no step portion in this case, the punch-cutter 43 of this type has a good ability to cut into the outer layer 11 forcibly and move forward and a favorable hooking function.

This invention has been described with respect to its features and action-and-effects while referring to the drawings. However, it is to be understood that this invention should not be construed as limitative to these embodiments. For example, the punch-cutters to be used were described in three embodiments, but a further variety of punch-cutters can be adopted for this invention, giving consideration to the ability of the cylindrical blade 44 to cut into the outer layer 11 forcibly and move forward, and the hooking function that prevent the cut piece from being left in place. Thus, the punch-cutter can also have a hooking portion comprising a plural number of projections in an appropriate shape disposed along the circumference of the inner peripheral surface of the cylindrical blade. The laminated, blow-molded container of an easy-to-delaminate type of this invention can also be used as a dispensing container with a comb attachment fitted to the neck of the bottle, or as an easy-to-delaminate container of a squeeze type, in addition to the dispensing container with a pump.

INDUSTRIAL APPLICABILITY

As described above, the process for forming one or more air intake holes of this invention allows the air intake holes to be formed while keeping the inner layer intact without leaving in it any vestige of cut caused by the blade edge of the punch-cutter. The laminated, blow-molded container of this invention ensures that the peeling of the inner layer from the outer layer would go on smoothly and reliably around the inside opening of each air intake hole on the inner-surface side of the outer layer. Thus, the container of this invention is expected to have wide applications of use in the field of easy-to-delaminate containers which are convenient to use.

DESCRIPTION OF REFERENCE SIGNS

1. Container
2. Neck
3. Shoulder
4. Body
11. Outer layer
11a. Cut piece
11b. Uncut portion
11c. Irregular surface (caused by flash)
12. Inner layer
14. Air intake hole
14a. Horn-shaped area
S. Peeled space
N. Notched interspace
A. Outside air
21. Cap
22. Screw-threaded inner wall of the cap
23. Top plate of the cap
25. Dispensing pump
26. Nozzle head
27. Fitting flange
28. Gasket ring
30. Punch-cutting device
31. Stationary member
32. Support section
33. Support shaft
34. Support rod
36. Cutter stop
36a. Opposed surface
37. Bolt
40. Cutting member
41. Sliding member
42. Cutter holder
43. Punch-cutter
44. Cylindrical blade
44p. Blade edge
45. Hooking portion
45a. Diameter-reduced step portion
45a1. Diameter-increased taper portion
45b. Diameter-reduced taper portion
46. Through-hole
t. Gap

The invention claimed is:

1. A blow-molded container comprising a synthetic resin outer layer that forms an outer shell in a fixed shape and a synthetic resin inner layer laminated with this outer layer in a peelable manner,
   wherein one or more air intake holes is/are cut out through the outer layer at a predetermined position or positions of a neck,
   wherein an inside opening of the each air intake hole has a horn shape with an increased diameter on an inner-surface side of the outer layer,
   wherein notch-like interspace is formed between the outer layer and the inner layer in a peripheral area of the inside opening of the each air intake hole, the notch-like interspace being formed along an entire periphery of the inside opening of the each air intake hole,
   wherein an irregular surface having a scar of a broken uncut portion is formed along an entire periphery of an edge of the inside opening of the each air intake hole on the inner-surface side of the outer layer,
   wherein the inner-surface side of the outer layer has a removed portion such that the notch-like interspace is formed between the removed portion of the inner-surface side of the outer layer and the inner layer along the entire periphery of the inside opening of the each air intake hole, and
   wherein the irregular surface is formed on a surface of the removed portion of the inner-surface side of the outer layer along an entire periphery of an edge of the removed portion of the outer layer.

2. The blow-molded container according to claim 1, wherein a process forms the one or more air intake holes in the blow-molded container with a punch-cutter wherein:
   the punch-cutter to be used has a cylindrical blade at the tip, and also has a hooking portion or portions, which is/are disposed on an inner peripheral surface of the cylindrical blade and which perform a function of hooking into a portion of the outer layer that has come inside the cylindrical blade so as to prevent the cylindrical blade from slipping out of this portion of the outer layer at a time when the cylindrical blade is moved backward,
   the cylindrical blade is pressed forward until a blade edge comes to a position quite close to an inner surface of the outer layer, and at this position, the outer layer is not yet cut through completely, but there still remains a circular uncut portion ahead of the blade edge,
   then, the cylindrical blade is moved backward, and a cut piece inside the cylindrical blade is also moved backward along with the uncut portion because of the function of the hooking portion or portions that can hook into a portion of the outer layer that has come inside the cylindrical blade so as to prevent the cylindrical blade from slipping out of this portion of the outer layer, and
   the uncut portion is broken due to this backward movement, and the cut piece is taken out in a completely cut shape so that the air intake hole is cut out as a through-hole.

3. The blow-molded container according to claim 2 wherein diameter-reduced step portions are disposed in some places on the inner peripheral surface of the cylindrical blade of the punch-cutter, and are used as the hooking portion or portions.

4. The blow-molded container according to claim 3 wherein the inner peripheral surface of the cylindrical blade is formed so that a bore diameter widens in a tapered manner over an area ranging from the edges of the diameter-reduced step portions to the blade edge.

5. The blow-molded container according to claim 3 wherein the diameter-reduced step portions are disposed at some intervals in the circumferential direction.

6. The blow-molded container according to claim 2 wherein a diameter-reduced taper portion is formed on the inner peripheral surface of the cylindrical blade of the punch-cutter by reducing the diameter toward the blade edge in a tapered manner, and is used as the hooking portion.

7. The blow-molded container according to claim 4 wherein the diameter-reduced step portions are disposed at some intervals in the circumferential direction.

* * * * *